United States Patent
Min et al.

(10) Patent No.: US 10,629,207 B2
(45) Date of Patent: Apr. 21, 2020

(54) CACHING SCHEME FOR VOICE RECOGNITION ENGINES

(71) Applicant: Comcast Cable Communications, LLC, Philadelphia, PA (US)

(72) Inventors: Rui Min, Vienna, VA (US); Hongcheng Wang, Falls Church, VA (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 52 days.

(21) Appl. No.: 15/648,700

(22) Filed: Jul. 13, 2017

(65) Prior Publication Data

US 2019/0019517 A1    Jan. 17, 2019

(51) Int. Cl.
*G10L 15/30* (2013.01)
*G10L 15/22* (2006.01)
*G10L 15/26* (2006.01)
*G10L 25/51* (2013.01)

(52) U.S. Cl.
CPC .............. *G10L 15/30* (2013.01); *G10L 15/22* (2013.01); *G10L 15/26* (2013.01); *G10L 25/51* (2013.01)

(58) Field of Classification Search
CPC ......... G10L 15/26; G10L 13/00; G10L 15/22; G06F 3/167
USPC .................................................. 704/235, 275
See application file for complete search history.

(56) References Cited

U.S. PATENT DOCUMENTS

| | | | |
|---|---|---|---|
| 2003/0125933 A1* | 7/2003 | Saunders | G09B 5/04 704/201 |
| 2003/0182131 A1* | 9/2003 | Arnold | G10L 15/32 704/275 |
| 2006/0218240 A1* | 9/2006 | Yang | H04B 1/205 709/217 |
| 2013/0275875 A1* | 10/2013 | Gruber | G10L 15/22 715/728 |
| 2015/0186545 A1* | 7/2015 | Krutzler | G06F 3/04883 715/234 |
| 2016/0180840 A1* | 6/2016 | Siddiq | G10L 15/1815 704/257 |
| 2018/0220213 A1* | 8/2018 | Wu | H04R 1/26 |

* cited by examiner

*Primary Examiner* — Jakieda R Jackson
(74) *Attorney, Agent, or Firm* — BakerHostetler

(57) ABSTRACT

A cache associated with a voice recognition engine may be configured to receive an audio file corresponding to a voice query. The voice query may be received by the voice recognition engine from a user device in response to receipt of the voice query by the user device at the user device. The cache may be configured to determine an audio fingerprint based on the audio file and to determine whether the audio fingerprint corresponds to one of a plurality of audio transcriptions stored in the cache. The audio transcriptions may correspond to popular voice queries received at the voice recognition engine and processed by a server capable of performing automated speech recognition. In response to determining that the audio fingerprint corresponds to a given one of the stored audio transcriptions, the audio file may be processed based on the stored audio transcription.

20 Claims, 7 Drawing Sheets

CACHING SCHEME FOR VOICE RECOGNITION ENGINES

BACKGROUND

Voice recognition systems and user devices configured to receive and respond to voice queries are becoming increasingly common. A voice query may be, for example, a spoken command to the user device to perform some action, a spoken request to view or play some particular content, a spoken request to search for certain content or information based on search criteria, or any other spoken request or command that may be uttered by a user of the user device. By removing the need to use buttons and other modes of selection, such devices may be controlled by a human operator in a hands-free manner and allow the user to issue voice queries while performing other tasks. When a user device in communication with a voice recognition engine receives a voice query from a user, the user device may be configured to send an audio file of the voice query to the voice recognition engine where it may be processed to determine the meaning of what the user uttered. Processing of the voice query may require complex automated speech recognition services that are not capable of being handled efficiently by the voice recognition engine itself. For this reason, the voice recognition engine may send the audio file to an automated speech recognition service capable of transcribing the voice query and sending a transcription of the voice query back to the voice recognition engine where a response may be generated. The automated speech recognition service may be operated by a third party. This process may occur in a manner of seconds and may be transparent to the user. However, use of the automated speech recognition service may sometimes introduce undesirable delay, possibly affecting the user experience.

SUMMARY

In one aspect, methods and systems for responding to a voice query using audio fingerprints stored in a cache are disclosed herein. A cache associated with a voice processing or recognition engine may be configured to receive an audio file corresponding to a voice query. The audio file may be received by the voice processing or recognition engine from a user device in response to receipt of the voice query at the user device. The cache or an associated processing device may be configured to determine at least one of an amount or size of audio files capable of being sent from the voice processing system to a computing device over a given time period, for example, every second, and to compare the amount and or size of audio files capable of being sent from the voice processing system to a computing device to a threshold. In one example, the cache may determine that the amount or size of audio files capable of being sent from the voice processing system to the computing device is below the threshold, and in response to this determination, may be configured to determine an audio fingerprint based on the audio file, compare the audio fingerprint with a plurality of stored audio fingerprints and associated transcriptions, and associate the audio file with a first audio fingerprint of the plurality of stored audio fingerprints. In another example, the cache may determine that the amount or size of audio files capable of being sent from the voice processing system to the computing device is above the threshold, and in response to this determination may be configured to send the audio file to the computing device and receive a second audio transcription of the audio file. The audio file may be processed at the voice processing engine based on at least one of the first audio transcription and the second audio transcription.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
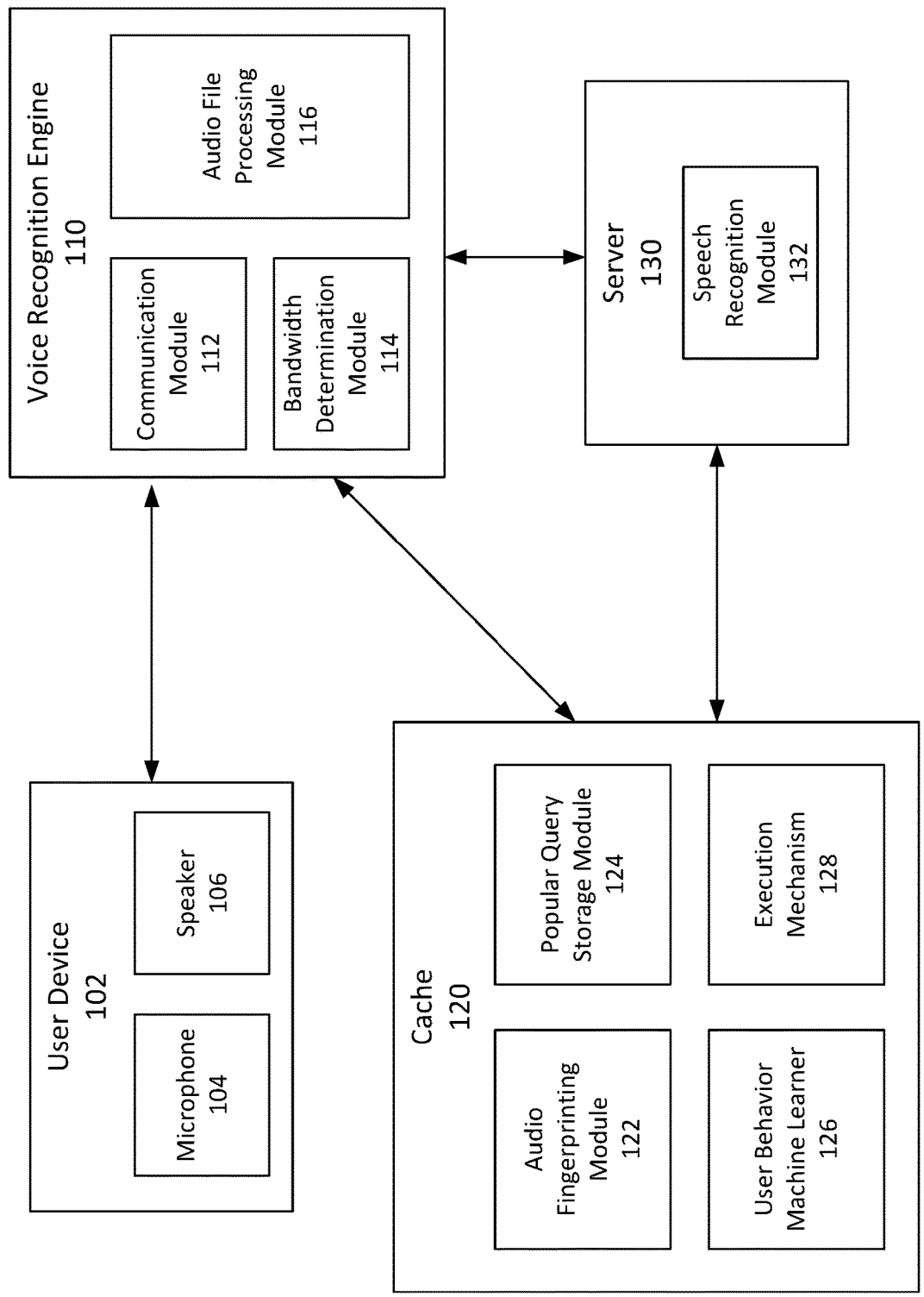
FIG. 1 shows an example block diagram of a system 100 in accordance with aspects of the disclosure.

Voice recognition engines often rely on speech recognition services to generate transcriptions for voice queries. For example, a voice query may be received at a user device and may be sent as an audio file from the user device to a voice recognition engine. The voice recognition engine may be unable to process the voice query without performing automated speech recognition on the audio file. However, automated speech recognition is a complicated process requiring a large amount of storage and processing power. Thus, the voice recognition engine may be configured to send the audio file to a server capable of performing automated speech recognition and to receive, from the server, a transcription of the voice query. The server may be operated by a third party. This transcription may then be used by the voice recognition engine in responding to the voice query. For example, the voice recognition engine may employ natural language processing techniques to determine the meaning of the transcription.

In one example use case, a user may employ a user device, such as a cable set-top box remote control, to speak a voice query, such as "tune to HBO." A microphone in the remote control may capture the spoken command in the form of an audio file, and the audio file may be transmitted to the set-top box. The set-top box may forward the audio file to a voice recognition engine responsible for determining what the user said and responding accordingly. The voice recognition engine may send the audio file to a server implementing an automated speech recognition engine, which may be operated by a third party, in order to perform automated speech recognition on the user's voice query. The automated speech recognition engine may then send a transcription of the audio file, in this example the text "Tune to HBO," back to the voice recognition engine. The voice recognition engine may then employ natural language processing techniques to understand the meaning of the text "Tune to HBO." In this example, the voice recognition engine would recognize that the user wishes to tune to the channel carrying the television programming for "HBO." The voice recognition engine may then cause a command to be sent to the user's set-top box to cause the set-top box to tune to the channel carrying the programming for "HBO."

In examples such as these, the process of sending the audio file to the server for automated speech recognition may cause considerable delays in responding to the voice query. In situations where there is a strong locality between voice queries, it may be possible to store these transcriptions in a cache and to use these transcriptions to process a received voice query without having to send the audio file to the server for speech recognition. For example, a cache and an associated processing device, such as processing device 150 illustrated in FIG. 1, may receive an audio file corresponding to the voice query and may determine an audio fingerprint based on the audio file. The cache may further determine whether the audio fingerprint corresponds to an audio transcription stored in the cache and, in response to determining that the audio fingerprint corresponds to a stored audio transcription, may process the audio file without the need for automated speech recognition services.

FIG. 1 shows an exemplary system 100 by which a cache, such as cache 120, may store a plurality of audio fingerprints corresponding to popular voice queries received at a user device, such as user device 102. The user device 102 may be configured to receive voice queries or voice commands via a microphone, such as microphone 104. The user device 102 may further comprise a speaker, such as speaker 106. The speaker 106 may be configured to output audio in response to receipt of the voice query. For example, a voice query may be received through the microphone 104 comprising an utterance such as "what is the current temperature." In response to the voice query, the user device 102 through the speaker 106 may output a response such as "the current temperature is seventy-six degrees."

The system 100 may comprise a voice recognition engine, such as voice processing engine 110. The voice recognition engine 110 may comprise a communication module 112, a bandwidth determination module 114, and an audio file processing module 116. The communication module 112 may be configured to communicate with each of the user device 102, the cache 120 and the server 130. The communication module 112 may communicate with the user device 102 in order to receive an audio file corresponding to a voice query received at the user device 102 and to send, to the user device 102, a response to the voice query based on a processing of the audio file. The communication module 112 may communicate with each of the cache 120 and the server 130 by sending, to at least one of the cache 120 and the server 130, the audio file, and receiving, from at least one of the cache 120 and the server 130, a transcription corresponding to the audio file, as discussed further herein.

The bandwidth determination module 114 may be configured to determine an amount and/or size of audio files capable of being sent from the voice recognition engine 110 to the server 130 over a given time period, for example, every second. The determined bandwidth may be used by the voice recognition engine 110 in determining whether to send the audio file to one of the cache 120, the server 130, or both the cache 120 and the server 130. If the bandwidth determination module 114 determines that the number of audio files currently being sent to and received from the server 130 is below a predetermined threshold, the bandwidth determination module 114 may instruct the voice recognition engine 110 to send the audio file to the cache 120. However, if the amount and/or size of the audio files being sent between the voice recognition engine 110 and the server is above the predetermined threshold, the bandwidth determination module 114 may instruct the voice recognition engine 110 to send the audio file to the server 130, even if the audio file is capable of being processed by the cache 120.

The audio file processing module 116 may be configured to determine the meaning of the user utterance from the audio transcription using, for example, natural language understanding techniques, and to generate a response to the user's voice query based on the determined meaning of the words in the audio transcription received from at least one of the cache 120 and the server 130. The audio transcription may be received from the cache 120 and the server 130 via the communication module 112 associated with the voice recognition engine 110. As discussed herein, the audio file received from the user device 102 may not be processed by the voice recognition engine 110 in its current format. However, the audio transcription received from at least one of the cache 120 or the server 130 may be in a format that can be processed by the voice recognition engine 110. Thus, the audio file processing module 116 may process the audio file based on the audio transcription received from the at least one of the cache 120 and the server 130.

The cache 120 may be configured to receive, from one of the user device 102 or the voice recognition engine 110, an audio file corresponding to a voice query received at the user device 102. Although the cache 120 is shown as being separate from the voice recognition engine 110, it is understood that the cache 120 may be included as part of the voice recognition engine 110. The cache 120 or an associated processing device may be configured to determine an audio fingerprint based on the audio file and to compare the audio fingerprint with a plurality of audio fingerprints corresponding to known audio transcriptions stored in the cache 120, as discussed further herein. The cache 120 may comprise, for example, an audio fingerprinting module 122, a popular query storage module 124, a user behavior machine learner 126 and an execution mechanism 128.

The audio fingerprinting module 122 or an associated processing device may be configured to determine an audio fingerprint based on an audio file received, for example, from a voice recognition engine such as voice recognition engine 110 or a user device such as user device 102. The audio fingerprint may be determined using an audio fingerprinting algorithm, as discussed further herein. The audio fingerprint may comprise a unique audio characteristic associated with the received audio file. For example, the audio fingerprint may comprise a randomly selected portion of the audio file, such as a sampling of the audio file captured once every 100 milliseconds. This unique portion of the audio file may be used to identify the audio file at some point in the future. For example, as discussed further herein, the cache 120 may be configured to receive, from the voice recognition engine 110, an audio file. The cache 120 or an associated processing device may be further configured to determine an audio fingerprint based on the received audio file, and to compare the audio fingerprint based on the received audio file with one or more audio fingerprints stored in the cache 120, each of which may correspond to a known audio transcription. If the cache 120 determines that the audio fingerprint corresponds to a given one of the fingerprints associated with a stored audio transcription, then there may be no need to send the audio file to a server capable of performing automated speech recognition, such as server 130, thereby saving considerable time and resources. Instead, the cache 120 may simply return the stored audio transcription associated with the matching audio fingerprint.

Generating an audio fingerprint may comprise the following steps: (1) background noise reduction and audio-sampling; (2) feature extraction based on a spectrogram of the audio file; (3) hash code generation and (4) hash code comparison based on a distance metric, such as Levenshtein distance metric. In one aspect, the hash code may be generated using a deep learning based approach, such as Semantic Hashing and Restricted Boltzmann Machine, in order to automatically learn the features and hash codes simultaneously from the spectrum of the audio files. For example, a deep neural network may be used to encode multiple utterances of the same transcription, such that the cache 120 may learn the feature representation layer-by-layer.

In one example, in addition to sending the audio file to the cache 120, the audio file may be sent to the server 130. The server 130 may be configured to perform automated speech recognition processing on the audio file and to generate an audio transcription based on the audio file. The cache 120 may receive the audio transcription generated by the server 130 from one of the server 130 or the voice recognition engine 110, and may associate the audio transcription with an audio fingerprint generated from the audio file from which that audio transcription was determined. The audio fingerprint and its associated audio transcription may be stored by the cache 120, for example, in the popular query storage module 124.

The popular query storage module 124 may be configured to store one or more audio fingerprints generated by the audio fingerprinting module 122, as well as the corresponding voice queries and the audio transcriptions received, for example, from the server 130. The popular query storage module 124 may store the plurality of audio fingerprints and associated audio transcriptions based, for example, on a popularity of the voice queries corresponding to the audio transcriptions. In one example, the popular query storage module 124 may store the audio transcriptions/fingerprints associated with the top fifty most recent or historic voice queries received at one or more user devices 102. The module 124 may also store anticipated audio transcriptions/fingerprints that have not yet been received from users, based on anticipated request due to, for example, new content or channels becoming available. The popular query storage module 124, as discussed further herein, may be configured to compare the plurality of stored audio fingerprints with an audio fingerprint determined from a newly received audio file. If the audio fingerprint based on the newly received audio file matches, within a degree of error, one of the plurality of stored audio fingerprints, then there may be no need to send the audio file to the server 130 capable of performing automated speech recognition. Instead, the cache 120 may simply return the audio transcription stored for the matching audio fingerprint.

The user behavior machine learner 126 may be configured to automatically update the results stored in the cache 120 based on information received from one of the voice recognition engine 110 or the server 130. For example, the user behavior machine learner 126 may be configured to update an audio fingerprint stored in the popular query storage module 124 based on an audio file received, for example, from the voice recognition engine 110, and on an audio transcription received, for example, from the server 130. The user behavior machine learner 126 may be configured to receive, from the server 130, an audio transcription based on a received audio file, and may be configured to update the audio fingerprint stored in the popular query storage module 124 by creating an audio fingerprint of the audio file associated with the received audio transcription. Characteristics of this new audio fingerprint may be used to update the audio fingerprint associated with the same audio file and corresponding transcription received from the server 130. Each voice query associated with the received audio files may be unique based, for example, on a volume of the received voice query or an accent of the user communicating with the user device 102. Thus, each audio fingerprint stored in the popular query storage module 126 may be associated with a plurality of slightly varying voice queries. The user behavior machine learner 126 may be configured to "train" the popular query storage module 124 with millions of audio files corresponding to the same transcription by updating the audio fingerprints of the audio files associated with those transcriptions.

The execution mechanism 128 may be configured to determine, when the requests are sent to both the cache 120 and the server 130, whether to use the result determined at the cache 120 or the result received from the server 130. This determination may be made based, for example, on the throughput and stability of the system 100, as well as on a quality of the result determined at the cache 120 and a quality of the result received from the server 130. The execution mechanism 128 may be further configured to send, to the voice recognition engine 110, the result determined at the cache 120. The result may comprise, for example, the audio transcription stored in the cache 120 corresponding to the matching audio fingerprint.

In one example, the cache 120 may be a universal cache. The universal cache may be configured to receive, from the server 130, audio transcriptions corresponding to voice queries received from any number of users. For example, as discussed further herein, the universal cache may comprise a single transcription for millions of received voice queries, such as millions of users around the country speaking "tune to ESPN." Each of the voice queries may be associated with the transcription at the server 130 and the respective audio files may be sent to the cache 120 to be used as "training" data in order to improve cache accuracy. In another example, the cache 120 may be a device dependent cache. The device dependent cache may be unique to a device associated with one or a limited number of users, such as a set top box located in a single household. The device dependent cache may be configured to receive from the server 130 and to store only transcriptions for voice queries received through that set-top box. Thus, only transcriptions corresponding to the voice query "tune to ESPN" received at the individual set-top box will be used as training data. It is understood that a user may take advantage of both the universal cache and the device dependent cache in a single implementation.

The server 130 may be any server configured to perform automated speech recognition. The server 130 may comprise a speech recognition module 132. The speech recognition module 132 may comprise, for example, one or more of a speech capture module, a digital signal processor (DSP) module, a preprocessed signal storage module, a reference speech pattern module and a pattern matching algorithm module. Speech recognition may be done in a variety of ways and at different levels of complexity, for example, using one or more of pattern matching, pattern and feature analysis, and language modeling and statistical analysis, as discussed further herein. However, it is understood that any type of speech recognition may be used, and the examples provided herein are not intended to limit the capabilities of the speech recognition component 132.

Pattern matching may comprise recognizing each word in its entirety and employing a pattern matching algorithm to match a limited number of words with stored reference speech patterns. An example implementation of pattern patching is a computerized switchboard. For example, a person who calls a bank may encounter an automated message instructing the user to say "one" for account balance, "two" for credit card information, or "three" to speak to a customer representative. In this example, the stored reference speech patterns may comprise multiple reference speech patterns for the words "one" "two" and "three." Thus, the computer analyzing the speech may not have to do any sentence parsing or any understanding of syntax. Instead, the entire chunk of sound may be compared to similar stored patterns in the memory.

Pattern and feature analysis may comprise breaking each word into bits and recognizing the bits from key features, for example, the vowels contained in the word. For example, pattern and feature analysis may comprise digitizing the sound using an analog to digital converter (A/D converter). The digital data may then be converted into a spectrogram, which is a graph showing how the component frequencies of the sound change in intensity over time. This may be done, for example, using a Fast Fourier Transform (FFT). The spectrogram may be broken into a plurality overlapping acoustic frames. These frames may be digitally processed in various ways and analyzed to find the components of speech they contain. The components may then be compared to a phonetic dictionary, such as one found in stored patterns in the memory.

Language modeling and statistical analysis is a more sophisticated speech recognition method in which knowledge of grammar and the probability of certain words or sounds following one from another is used to speed up recognition and improve accuracy. For example, complex voice recognition systems may comprise a vocabulary of over 50,000 words. Language models may be used to give context to words, for example, by analyzing the words proceeding and following the word in order to interpret different meanings the word may have. Language modeling and statistical analysis may be used to train a speech recognition system in order to improve recognition of words based on different pronunciations.

In contrast to the server 130, the cache 120 may not perform any feature extraction in determining a transcription corresponding to the audio file. Instead, the cache 120 or an associated processing device may be configured to determine an audio fingerprint based on the audio file, and to compare the audio fingerprint with a number of audio fingerprints stored in the cache, as discussed further herein. The cache 120, for example, through the user behavior machine learner 126, may automatically learn all of the features, categories and classes of voice queries received at the user device 102. The cache 120 may not extract acoustic features of the utterances and may not perform a cache lookup based on feature pattern matching. In addition, the cache 120 may be configured to take into consideration, for example, geo-location information, timing information and user language preferences in determining a corresponding transcription for an audio file. For example, if a certain class of users frequently turns to a specific channel at the same time every night, the user behavior machine learner module 126 may take that into consideration in finding a transcription.

As discussed herein, the process of sending the audio file and receiving a transcription of the audio file from the server 130 may cause considerable delays to the voice recognition engine 110. The speech recognition step is on the critical path of the voice query recognition process. If an error occurs, for example, at the network, at a load balancer, at a software gateway or in the algorithm implemented by the server 130, the voice recognition engine 110 may be unable to provide voice query results to the user, resulting in a poor user experience. Currently, speech recognition failures are the cause of the majority of service failure spikes. However, in situations where there is a strong locality between voice queries, it may be possible to store these transcriptions in the cache 120 and to use these transcriptions to process a received voice query without having to send the audio file to the server 130 for speech recognition.

Figure 2:
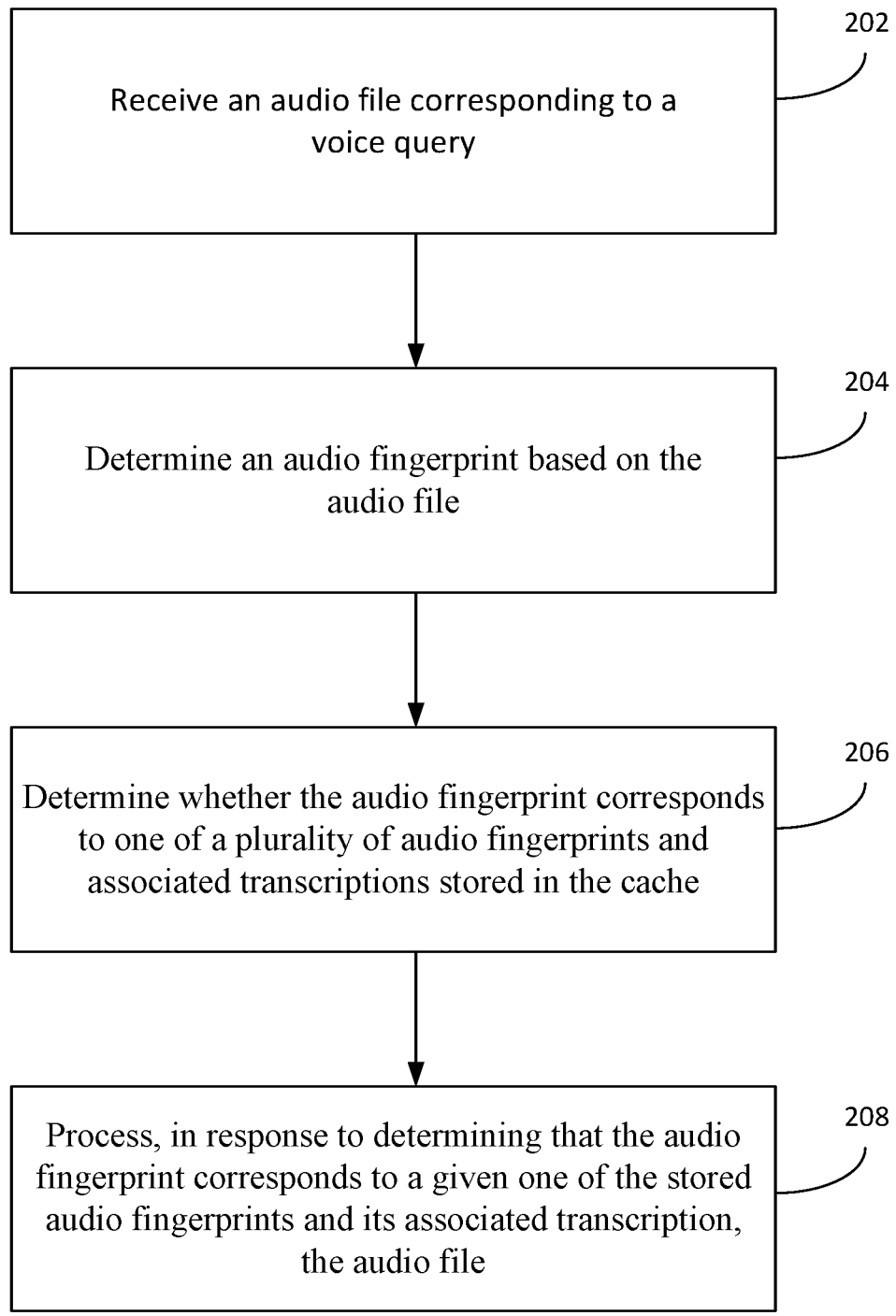
FIG. 2 shows a flow chart of an exemplary method in accordance with aspects of the disclosure.

FIG. 2 is a flow chart for an example method 200 for processing audio files in a cache. As shown at step 202 of FIG. 2, an audio file corresponding to a voice query may be received. The audio file may be received, for example, by a cache, such as cache 120. The audio file may be received by the cache 120 from a voice recognition engine, such as voice recognition engine 110. The voice query may be, for example, a spoken command to a user device, such as the user device 102, to perform some action, a spoken request to view or play some particular content, a spoken request to search for certain content or information based on search criteria, or any other spoken request or command that may be uttered by a user of the user device. The audio file of the voice query may be sent from the user device to a voice recognition engine, such as voice recognition engine 110. In one example, the voice query may comprise a voice command, such as the voice command "tune to ESPN."

At step 204, an audio fingerprint may be determined based on the audio file. The audio fingerprint may be determined, for example, by the cache 120 using an audio fingerprinting algorithm. The audio fingerprint may be a unique audio characteristic associated with the received audio file. For example, the audio fingerprint may comprise a randomly selected portion of the audio file, such as a sampling of the audio file captured once every 100 milliseconds. This unique portion of the audio file may be used to identify the audio file at some point in the future, as discussed further herein.

In one embodiment, the bandwidth determination module 114 may be configured to determine the amount and/or size of audio files capable of being sent from the voice recognition engine 110 to the server 130 over a given time period, for example, every second. If the bandwidth determination module 114 determines that the number of audio files currently being sent to and received from the server 130 is below a predetermined threshold, the bandwidth determination module 114 may instruct the voice recognition engine 110 to send the audio file to the cache 120. However, if the amount and/or size of the audio files being sent between the voice recognition engine 110 and the server 130 is above the predetermined threshold, the bandwidth determination module 114 may instruct the voice recognition engine 110 to send the audio file to the server 130, even if the audio file is capable of being processed by the cache 120. In another embodiment, the voice recognition engine 110 may send the audio file to the cache 120 regardless of the determined bandwidth.

At step 206, it may be determined whether the audio fingerprint corresponds to one of a plurality of audio fingerprints and associated transcriptions stored, for example, in the cache 120. The cache 120 may store a plurality of audio fingerprints and associated transcriptions, for example, in the popular query storage module 124. The stored audio transcriptions may have been generated by a server capable of performing automated speech recognition, such as the server 130 illustrated in FIG. 1. The plurality of audio fingerprints and associated transcriptions stored in the cache 120 may correspond to popular voice queries received at the user device 102 associated with the voice recognition engine 110. In the example that the audio file corresponds to the voice query "tune to ESPN," determining whether the audio fingerprint corresponds to one of a plurality of audio fingerprints stored in the cache may comprise comparing the audio fingerprint generated from the received audio file with each of the audio fingerprints and associated transcriptions stored in the cache and determining that a particular one of the stored fingerprints matches the fingerprint of the received audio file. In that case, the audio transcriptions associated with the matching stored fingerprint in the cache may be selected as the audio transcription for the received audio file—without having to perform automated speech recognition on the received audio file.

The plurality of audio fingerprints and associated transcriptions stored in the cache 120 may correspond to popular voice queries received at a user device, such as user device 102, associated with the cache 120. For example, the popular query storage module 124 associated with the cache 120 may store the audio fingerprints and associated transcriptions associated with the top fifty most recent popular voice queries received at the user device 102. These top fifty most recent popular voice queries may cover about 25% of the total number of voice queries received at the user device 102.

At step 208, in response to determining that the audio fingerprint generated from the received audio file corresponds to a given one of the stored audio fingerprints/transcriptions, the audio file may be processed in accordance with that determination. Processing the audio file may comprise generating a response to the voice query based on the stored audio transcription for the matching audio fingerprint in the cache 120. As discussed herein, an example voice query may comprise the statement "tune to ESPN" by a user of the user device 102. Determining that the audio fingerprint corresponds to a given one of the audio transcriptions may comprise determining that the audio fingerprint based on the voice query "tune to ESPN" corresponds to a stored audio fingerprint and associated audio transcription in the cache 120 that also corresponds to the voice query "tune to ESPN." In this example, processing the audio file may comprise generating and sending a response that instructs a set-top box associated with the user device 102 to tune its receiver to ESPN.

In one example, in response to determining that the audio fingerprint does not correspond to a stored audio fingerprint, the audio file may be sent to a server capable of performing automated speech recognition. For example, the audio file may be sent from the cache 120 to the server 130 in response to determining that the audio fingerprint does not correspond to a stored audio fingerprint. In response to sending the audio file to the server 130, an audio transcription determined from automated speech recognition performed on the audio file may be received from the server 130. The audio transcription received from the server 130 may be stored in the cache 120. The received audio transcription may be used by one of the cache 120 or the voice recognition engine 110 in responding to the voice query received at the user device 102. In addition, the audio transcription received from the server 130 may be stored in the cache 120 and may be used, for example, by the user behavior machine learner 126 in "training" the data stored in the popular query storage module 124. Thus, the audio transcription and an audio fingerprint generated from that same audio file may be added to the popular query storage module 124 and, next time an audio file is received at the cache 120 for processing, an audio fingerprint based on the audio file may be compared with the stored audio fingerprint and associated transcription to determine if there is a match.

Figure 3:
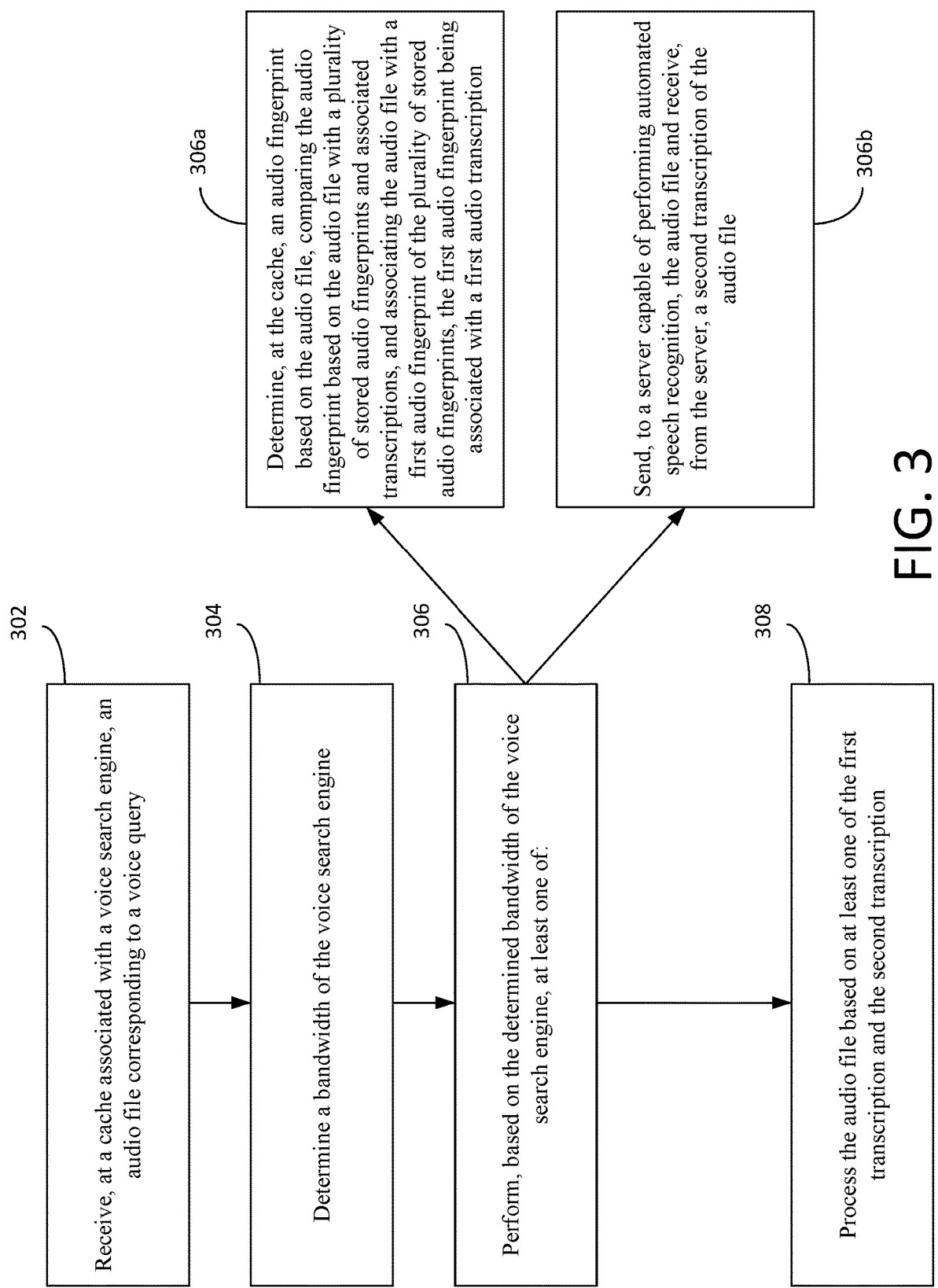
FIG. 3 shows a flow chart of an exemplary method in accordance with aspects of the disclosure.

FIG. 3 illustrates a flow chart for an example method 300. At step 302, an audio file corresponding to a voice query may be received. The audio file may be received, for example, by a cache associated with a voice recognition engine, such as cache 120 associated with voice recognition engine 110. The audio file may be received by the cache 120 associated with the voice recognition engine 110 from a user device, such as user device 102 illustrated in FIG. 1. The voice query may be, for example, a voice query detected at the user device 102 and sent from the user device 102 to the cache 120 associated with the voice recognition engine 110 as an audio file. In one example, the voice query may comprise a voice command, such as the voice command "tune to ESPN."

At step 304, an amount and/or size of audio files capable of being sent from the voice recognition engine 110 to the server 130 over a given time period (e.g., every second) may be determined In one embodiment, the bandwidth determination module 114 may be configured to determine the amount and/or size of audio files capable of being sent from the voice recognition engine 110 to the server 130 over the given time period. If the bandwidth determination module 114 determines that the number of audio files currently being sent to and received from the server 130 is below a predetermined threshold, the bandwidth determination module 114 may instruct the voice recognition engine 110 to send the audio file to the cache 120. However, if the amount and/or size of the audio files being sent to and received from the server 130 is above the predetermined threshold, the bandwidth determination module 114 may instruct the voice recognition engine 110 to send the audio file to the server 130, even if the audio file is capable of being processed by the cache 120. In another embodiment, the voice recognition engine 110 may send the audio file to the cache 120 regardless of bandwidth.

At step 306, the cache 120 may perform, based on the determined bandwidth of the voice recognition engine 110, at least one of a plurality of actions. In one example, as shown at step 306*a*, the cache 120 or an associated processing device may be configured to determine an audio fingerprint based on the audio file. The audio fingerprint may be determined, for example, using an audio fingerprinting algorithm. The audio fingerprint may be a unique audio characteristic associated with the received audio file. For example, the audio fingerprint may comprise a randomly selected portion of the audio file, such as a sampling of the audio file captured once every 100 milliseconds. This unique portion of the audio file may be used to identify the audio file at some point in the future, as discussed further herein.

The cache 120 may be further configured to compare the audio fingerprint based on the received audio file with a plurality of stored audio fingerprints and associated transcriptions. The cache 120 may store a plurality of such audio fingerprints and associated transcriptions, for example, in the popular query storage module 124. The stored transcriptions may have been generated by a server capable of performing automated speech recognition, such as server 130 illustrated in FIG. 1. The plurality of transcriptions stored in the cache 120 along with their associated audio fingerprints may correspond to popular voice queries received at the voice recognition engine 110. For example, the popular query storage module 124 associated with the cache 120 may store the audio fingerprints and associated transcriptions associated with the top fifty most recent popular voice queries received at the voice recognition engine 110 from the user device 102. These top fifty most recent popular voice queries may cover about 25% of the total number of voice queries received at the user device 102.

The cache 120 may be further configured to associate, in response to determining that the audio fingerprint based on the received audio file matches a first one of the stored audio fingerprints in the cache, the received audio file with the transcription associated with the matching audio fingerprint. Additionally or alternatively, the cache 120, as shown at step 406b and based on the amount and/or size of audio files capable of being sent from the voice recognition engine 110 to the server 130 over the given time period, may be configured to send, to a server capable of performing automated speech recognition, such as server 130, the audio file and to receive, from the server 130, a second transcription of the audio file. The second transcription of the audio file may be received by the cache 120 in response to the server 130 performing automated speech recognition on the audio file, for example, at the speech recognition module 132 of the server 130.

As discussed herein, the amount and/or size of files capable of being sent from the voice recognition engine 110 to the server 130 over a given time period may be used to determine whether a transcription for the audio file should be generated locally at the cache 120 or the audio file sent to the server 130 capable of performing speech recognition. Thus, in response to determining that the amount and/or size of the files currently being sent from the voice recognition engine 110 to the server 130 is below a predetermined threshold, the cache 120 or an associated processing device may be configured to determine an audio fingerprint based on the audio file, compare the audio fingerprint based on the audio file with a plurality of stored fingerprints and associated transcriptions, and associate the audio file with a first matching fingerprint and associated transcription of the plurality of stored fingerprints and associated transcriptions. Alternatively, in response to determining that amount and/or size of the files currently being sent from the voice recognition engine 110 to the server 130 above the predetermined threshold, the cache 120 may be configured to send the audio file to a server capable of performing automated speech recognition, such as server 130, and to receive, from the server 130, a second transcription of the audio file.

At step 308, the first transcription or the second transcription may be processed, such as by performing natural language understanding, to generate a response to the voice query. The cache 120 may determine whether to use the first transcription or the second transcription based, for example, on a quality of the first transcription and a quality of the second transcription.

In one example, the cache 120 may be configured to perform both of (i) determining, at the cache, an audio fingerprint based on the audio file, comparing the audio fingerprint based on the audio file with a plurality of stored audio fingerprints and associated transcriptions, and associating the audio file with a first transcription of the plurality of stored transcriptions when the fingerprint of the audio file matches the stored fingerprint associated with that first transcription, and (ii) sending, to a server capable of performing automated speech recognition, such as server 130, the audio file and receiving, from the server 130, a second transcription of the audio file. In this example, the cache may further determine whether to use the first transcription or the second transcription based on a quality of the first transcription and a quality of the second transcription.

One or more of the plurality of stored audio fingerprints may be updated based on the determined audio fingerprint and the second audio transcription. As discussed further herein, the cache 120 may store a plurality of audio fingerprints, each audio fingerprint being associated with an audio transcription corresponding to a voice query received at the user device 102. Each voice query may be unique based, for example, on a volume of the received voice query or an accent of the user communicating with the user device 102. Thus, each audio fingerprint stored in the popular query storage module 126 may be associated with a plurality of slightly varying voice queries. When the second transcription is received, for example, from the server 130, the cache 120 may update the fingerprint stored in the cache 120 by associating the generated fingerprint with a stored audio fingerprint corresponding to a transcription that matches the second transcription.

Figure 4:
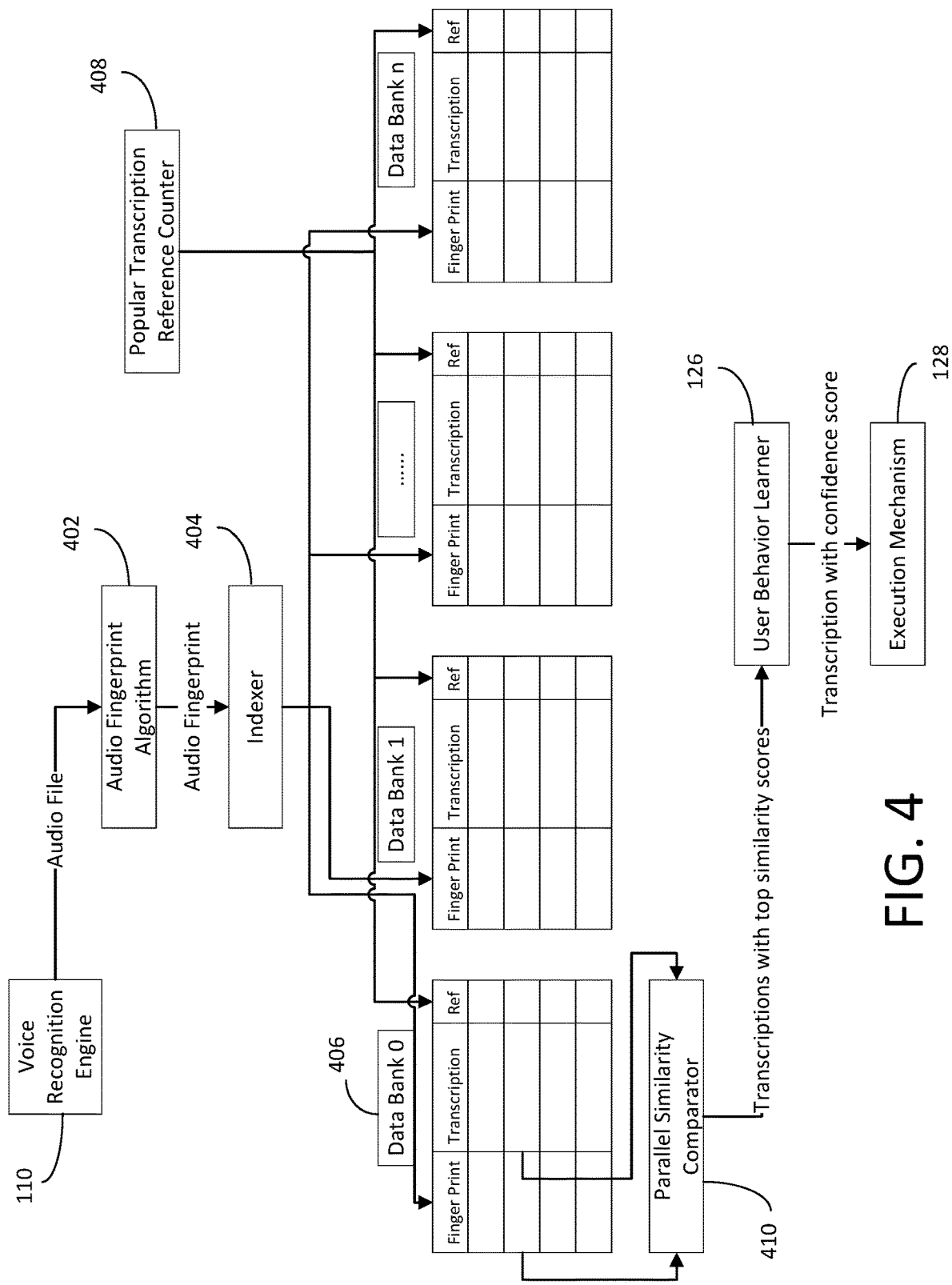
FIG. 4 shows an example cache system comprising a parallel similarity comparator.

FIG. 4 illustrates an example of a cache, such as cache 120, configured to store a plurality of audio transcriptions and to compare an audio fingerprint based on a received audio file with a plurality of stored audio fingerprints associated with the plurality of audio transcriptions. As discussed herein, the cache 120 may receive, from a voice recognition engine 110, an audio file corresponding to a voice query. The cache 120 may be configured to apply an audio fingerprint algorithm 402 to the audio file, thereby producing an audio fingerprint based on the audio file. Once the audio fingerprint algorithm has been applied, an indexer 404 may be configured to organize the plurality of audio fingerprints as an array into a plurality of databanks, such as databanks 406 illustrated in FIG. 4.

The plurality of stored audio fingerprints and associated audio transcriptions may be selected, for example, by the machine learner module 126 and stored inside the plurality of data banks. The databanks 406 may include, for example, databank 0, databank 1, through databank n, as illustrated in FIG. 4. Each of the databanks 406 may be configured to perform parallel processing to compare the audio fingerprint generated using the audio fingerprint algorithm 402 with the plurality of stored audio fingerprints and associated audio transcriptions. For example, the parallel similarity comparator 408 illustrated in FIG. 4 may be configured to compare the determined fingerprint to a first stored fingerprint, a second stored fingerprint, etc. A popular transcription reference counter 408 may be configured to associate the audio fingerprint and corresponding transcription with a reference number or variable. The transcriptions with the top similarity scores may be sent to the user behavior machine learner module 126 to train the data stored in the popular query storage module, as discussed further herein. The transcription with the greatest "confidence" score may be sent to the execution mechanism 128 to be processed.

Figure 5:
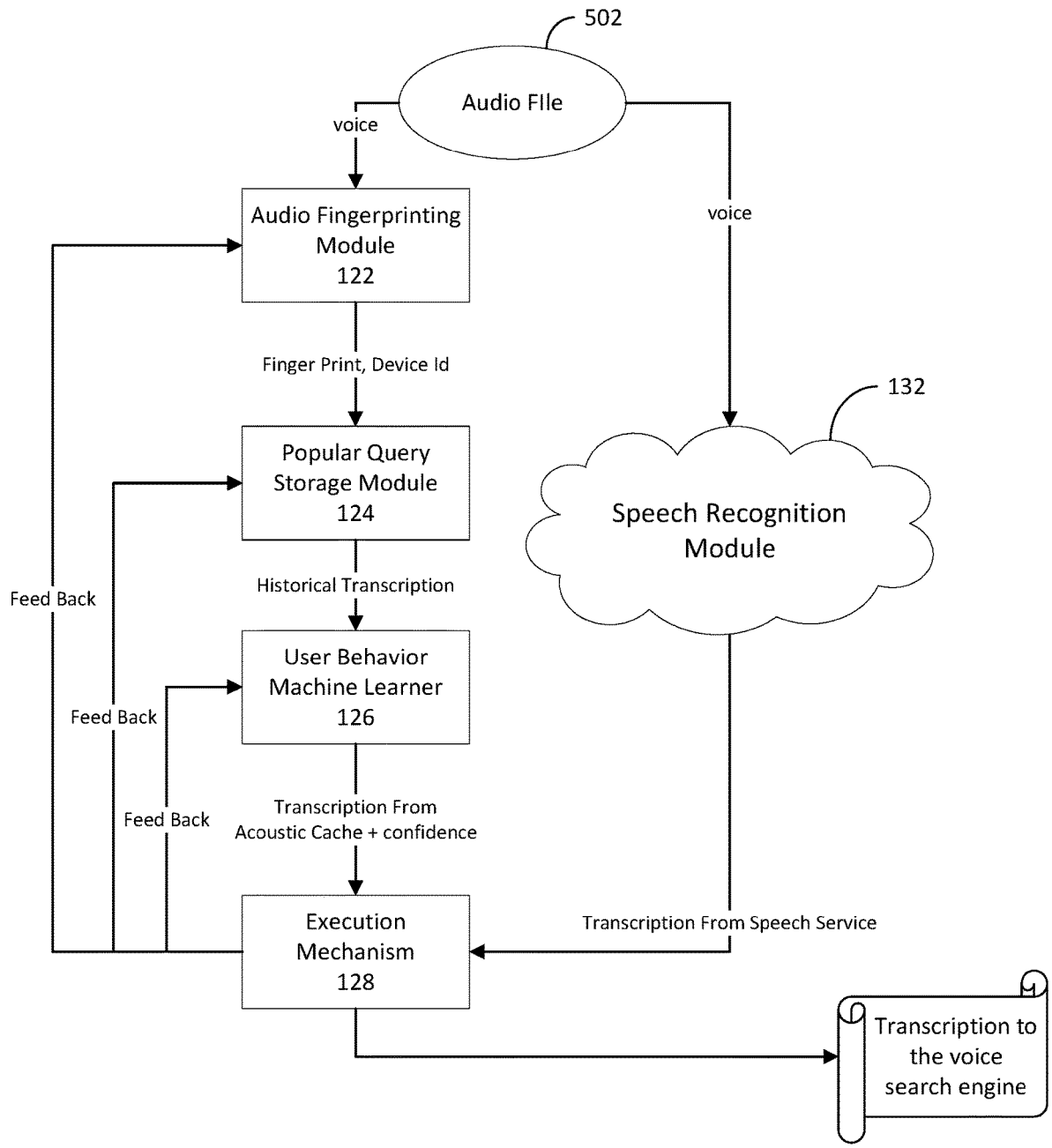
FIG. 5 shows a flow chart of an exemplary method in accordance with aspects of the disclosure.

FIG. 5 illustrates a flowchart for a method of sending an audio file to both a local cache and a speech recognition service, and updating the cache results based on the results received from the speech recognition service. For example, an audio file 502 may be received by a user device, such as user device 102 illustrated in FIG. 1. The audio file may be sent, for example, from the user device 102 to both the cache 120 and the speech recognition module 132 illustrated in FIG. 1. The audio transcription generated by the speech recognition module 132 may be sent to the execution mechanism 128 associated with the cache 120 in order to update the results stored in the cache 120. The results received from the speech recognition module 132, along with transcription reference patterns stored in the cache, user feedback, and the machine learning algorithms may help to improve the cache accuracy.

The execution mechanism 128 may be configured to determine, when the requests are sent to both the cache 120 and the server 130 capable of performing automated speech recognition, whether to use the result determined at the cache 120 or the result received from the server 130. This determination may be made based, for example, on the throughput and stability of the system 100, as well as on a quality of the result determined at the cache 120 and a quality of the result received from the server 130. Once the execution mechanism 128 determines whether to use the result determined at the cache 120 or the result received from the server 130, the execution mechanism 128 may send, to the voice recognition engine 110, the corresponding audio transcription.

As shown at FIG. 5, the execution mechanism 128 may be configured to provide feedback to each of the user behavior machine learner 126, the popular query storage module 124, and the audio fingerprinting module 122. For example, the execution mechanism 128 may monitor the association of the voice query and the corresponding transcription in the cache 120. If the cache 120 incorrectly associates a voice query with a corresponding transcription, the execution mechanism 128 may update the popular query storage module 124 to map the stored fingerprints to a new transcription. In addition, the execution mechanism 128 may instruct the audio fingerprinting module 122 and the popular query storage module 124 to update their entries so that the cache 120 does not repeat the incorrect association between the voice query and the corresponding transcription. In addition, although not shown in FIG. 5, each of the audio fingerprinting module 122, the popular query storage module 124, the user behavior machine learner 126, and the execution mechanism 128 may be configured to provide feedback to any of the other components of the cache 120.

Figure 6:
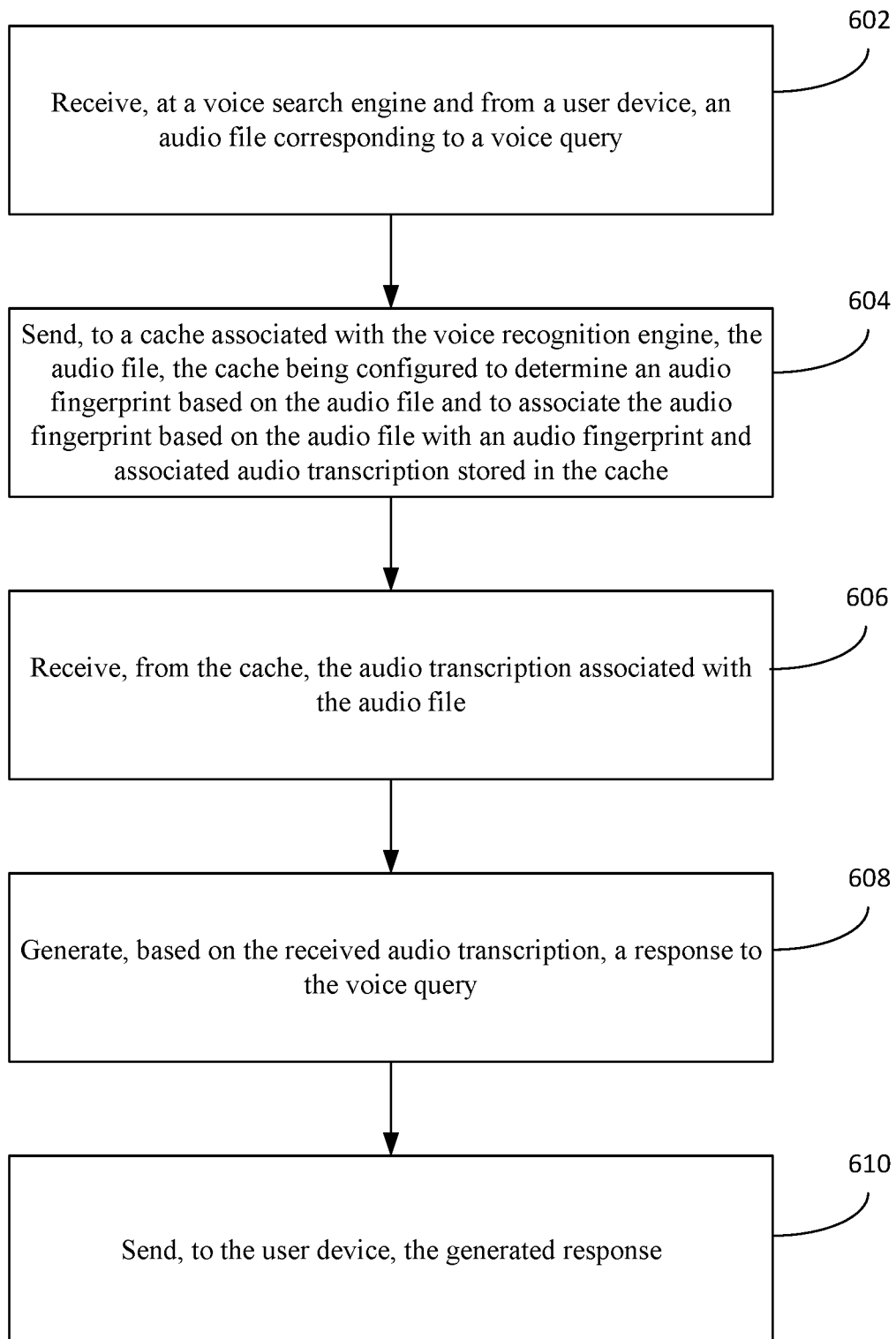
FIG. 6 shows a flow chart of an exemplary method in accordance with aspects of the disclosure.

FIG. 6 illustrates a method 600 for generating a response to a voice query. At step 602, an audio file corresponding to a voice query may be received. The audio file may be received, for example, at a voice processing engine, such as voice recognition engine 110, and from a user device, such as user device 102 illustrated in FIG. 1. The voice query may be detected at the user device 102 and sent from the user device 102 to the voice recognition engine 110 as an audio file. In one example, the voice query may comprise a voice command, such as the voice command "tune to ESPN."

At step 604, the audio file may be sent to a cache associated with the voice recognition engine, such as cache 110 illustrated in FIG. 1. The cache 120 or an associated processing device may be configured to determine an audio fingerprint based on the audio file and to associate the audio fingerprint based on the audio file with a stored audio fingerprint associated with an audio transcription in the cache. The audio fingerprint may be determined, for example, by the cache 120 using an audio fingerprinting algorithm. The audio fingerprint may be a unique audio characteristic associated with the received audio file. For example, the audio fingerprint may comprise a randomly selected portion of the audio file, such as a sampling of the audio file captured once every 100 milliseconds. This unique portion of the audio file may be used to identify the audio file at some point in the future, as discussed further herein.

At step 606, an audio transcription associated with the audio file may be received, for example, from the cache 120 associated with the voice recognition engine 110. As discussed herein, the cache 120 may store a plurality of audio fingerprints associated with a plurality of audio transcriptions, the plurality of audio fingerprints and audio transcriptions corresponding to popular voice queries received at the voice recognition engine 110. For example, the popular query storage module 124 associated with the cache 120 may store the audio fingerprints and audio transcriptions associated with the top fifty most recent popular voice queries received at the user device 102. These top fifty most recent popular voice queries may cover about 25% of the total number of voice queries received at the user device 102. In the example that the audio file corresponds to the voice query "tune to ESPN," determining whether the audio fingerprint corresponds to one of a plurality of audio transcriptions stored in the cache may comprise comparing the audio fingerprint based on the audio file with each of the audio fingerprints stored in the cache and determining that a particular one of the stored audio fingerprints also corresponds to the voice query "tune to ESPN." The cache 120 may then send, to the user voice recognition engine 110, the audio transcription associated with the matching audio fingerprint.

In one example, the voice recognition engine 110 may be configured to send the audio file to a server capable of performing automated speech recognition, such as server 130 illustrated in FIG. 1. In response to sending the audio file to the server 130, the voice recognition engine 110 may receive, from the server 130 capable of performing automated speech recognition processing, an audio transcription based on the audio file, and may send, to the cache 120, the received audio transcription and the corresponding audio file. Upon receiving the audio transcription and the corresponding audio file, the cache 120 may be configured to store the received audio transcription and the corresponding audio file. In the example that the audio file is also sent to the server 130, generating a response to the voice query may comprise generating, based on at least one of the audio transcription determined at the cache and the audio transcription received from the server capable of performing speech recognition, a response to the voice query. Sending the audio file to the server 130 capable of performing automated speech recognition may comprise sending the audio file to the server 130 in response to receiving, from the cache 120, an indication that the cache 120 does not comprise an audio fingerprint and associated audio transcription corresponding to the audio fingerprint based on the audio file.

At step 608, a response to the voice query may be generated based on the audio transcription received from the cache 120. The voice recognition engine 110 may be configured to use the audio transcription associated with the voice query in generating the response. In the example that the voice query comprises the voice command "tune to ESPN," and the cache 120 locates an audio fingerprint associated with an audio transcription stored in the cache that corresponds to the voice command, generating a response to the voice query may comprise sending, from the voice recognition engine 110 and to the nearest set-top box an indicator to tune to ESPN.

At step 610, the generated response may be sent to the user device, such as user device 102 illustrated in FIG. 1. Sending the generated response to the user device 102 may allow the user device to communicate, for example, with a user of the device or with another device. For example, if the voice query comprises the question "what is the temperature?" the user device 102, via the speaker 104, may be configured to output a response that "the current temperature is seventy-six degrees." In another example, if the voice query comprises the voice command "tune to ESPN," the voice recognition engine 110 may send, to the user device 102, the command "tune to ESPN" so that the user device 102 may communicate with the nearest set-top box to tune to ESPN.

Figure 7:
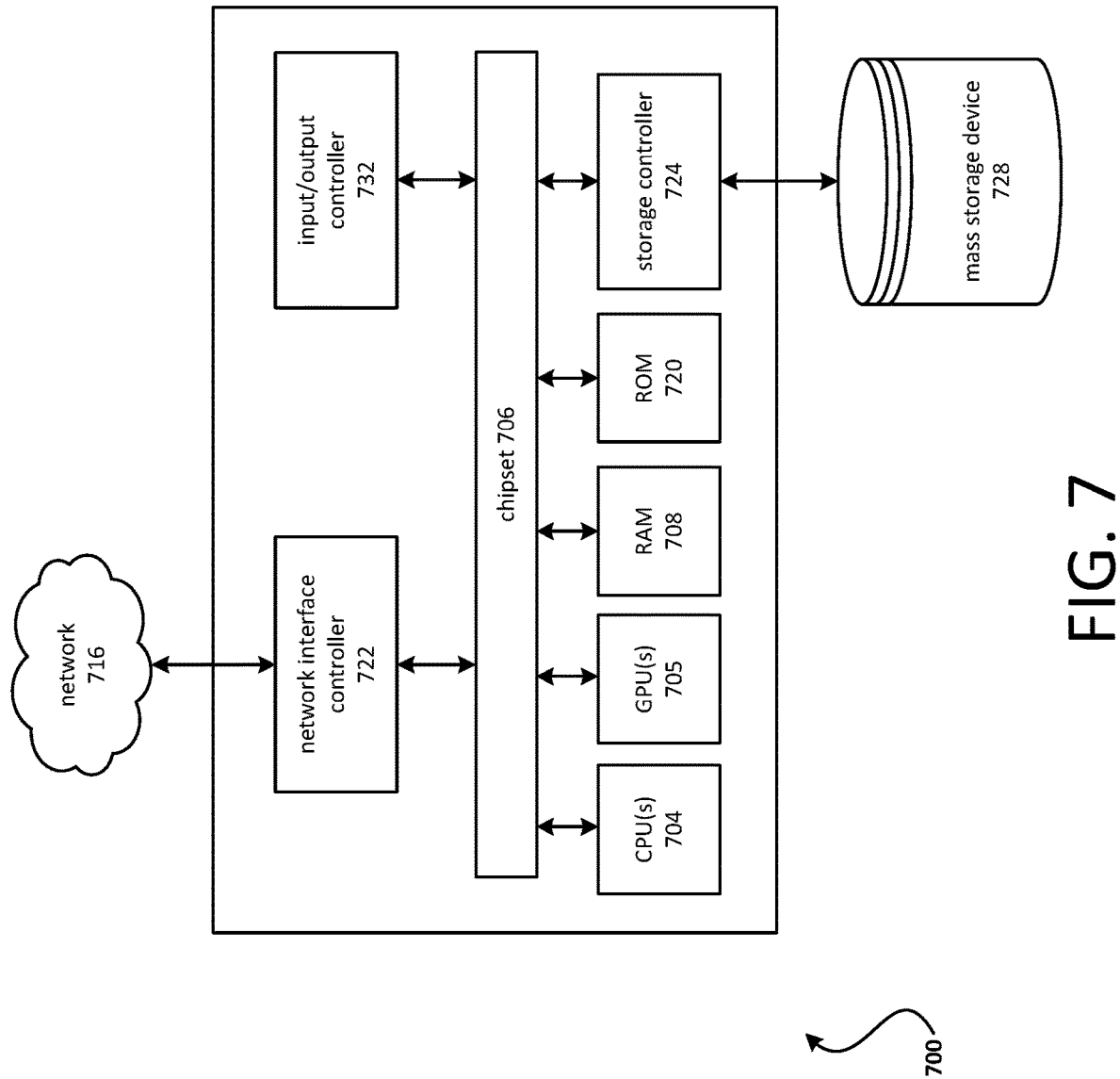
FIG. 7 illustrates a block diagram of an exemplary computing device.

FIG. 7 depicts a computing device that may be used in various aspects, such as the servers, modules, and/or devices depicted in FIG. 1. With regard to the example architecture of FIG. 1, the user device 102, the voice recognition engine 110, the cache 120, and/or the server 130 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2, 3 and 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2, 3 and 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving, at a cache associated with a voice processing system, an audio file corresponding to a voice query;
determining a quantity of audio files capable of being sent from the voice processing system to a computing device over a given time period;
comparing, to a threshold, the quantity of audio files capable of being sent from the voice processing system to the computing device and performing at least one of:
based on determining that the quantity of audio files is below the threshold, determining, at the cache, an audio fingerprint based on the audio file, comparing the audio fingerprint with a plurality of stored audio fingerprints and associated transcriptions, and associating the audio file with a first audio fingerprint of the plurality of stored audio fingerprints, the first audio fingerprint being associated with a first audio transcription; or
based on determining that the quantity of audio files is above the threshold, sending, to the computing device, the audio file and receiving, from the computing device, a second audio transcription of the audio file, the computing device being configured to perform speech recognition; and
processing the audio file based on at least one of the first audio transcription and the second audio transcription.

2. The method of claim 1, wherein the plurality of audio fingerprints and associated transcriptions correspond to popular voice queries received from one or more user devices associated with the cache.

3. The method of claim 1, wherein associating the audio file with a first audio fingerprint of the plurality of stored audio fingerprints comprises determining that the audio fingerprint based on the audio file corresponds to the first audio fingerprint of the plurality of stored audio fingerprints.

4. The method of claim 1, further comprising storing, in the cache, the second audio transcription.

5. The method of claim 4, further comprising:
determining, based on the second audio transcription, a second audio fingerprint; and
storing, in the cache, the second audio fingerprint.

6. The method of claim 1, wherein processing the audio file comprises generating a response to the voice query based on at least one of the first audio transcription and the second audio transcription.

7. The method of claim 1, wherein the cache is at least one of a universal cache or a device dependent cache.

8. A method comprising:
receiving an audio file corresponding to a voice query;
determining an audio fingerprint based on the audio file;

determining whether a number of audio files capable of being sent to a computing device configured to perform speech recognition is below a threshold;

determining whether the audio fingerprint corresponds to one of a plurality of audio fingerprints and associated transcriptions stored in a cache, the plurality of audio fingerprints and associated transcriptions stored in the cache corresponding to popular voice queries received from one or more user devices associated with the cache; and processing, based on determining that the number of audio files capable of being sent to the computing device configured to perform speech recognition is below the threshold, and based on determining that the audio fingerprint corresponds to a given one of the stored audio fingerprints and its associated transcription, the audio file.

9. The method of claim 8, wherein the transcriptions associated with the plurality of audio fingerprints are received from a computing device capable of performing speech recognition.

10. The method of claim 8, further comprising sending, based on determining that the audio fingerprint based on the audio file does not correspond to one of the plurality of stored audio fingerprints, the audio file to a computing device capable of performing speech recognition.

11. The method of claim 10, further comprising receiving, from the computing device capable of performing speech recognition, an audio transcription based on the audio file and storing, in the cache, the received audio transcription.

12. The method of claim 11, further comprising:
generating, based on the received audio transcription, an audio fingerprint; and
storing, in the cache, the generated audio fingerprint.

13. The method of claim 8, wherein processing the audio file comprises generating a response to the voice query based on the stored audio transcription.

14. The method of claim 8, wherein the cache is at least one of a universal cache or a device dependent cache.

15. A method comprising:
receiving, at a voice processing engine and from a user device, an audio file corresponding to a voice query;
sending, to a cache associated with the voice processing engine, based on a determination that a number of audio files capable of being sent to a computing device configured to perform speech recognition is below a threshold, the audio file, wherein the cache is configured to determine an audio fingerprint based on the audio file and to associate the audio fingerprint with a stored audio fingerprint and associated audio transcription, the cache storing a plurality of audio fingerprints and associated audio transcriptions corresponding to popular voice queries received at the user device;
receiving, from the cache, the audio transcription associated with the audio file;
generating, based on the audio transcription, a response to the voice query; and
sending, to the user device, the generated response.

16. The method of claim 15, further comprising sending the audio file to a computing device capable of performing speech recognition.

17. The method of claim 16, wherein the cache is at least one of a universal cache or a device dependent cache.

18. The method of claim 16, further comprising:
receiving, from the computing device capable of performing automated speech recognition, a second audio transcription based on the audio file; and
sending, to the cache, the second audio transcription, the cache being configured to store the second audio transcription.

19. The method of claim 18, wherein generating a response to the voice query comprises generating, based on the second audio transcription, a response to the voice query.

20. The method of claim 19, wherein sending the audio file to a server capable of performing automated speech recognition comprises receiving, from the cache, an indication that the cache does not comprise an audio fingerprint corresponding to the audio fingerprint based on the audio file.

* * * * *